Dec. 24, 1935.  J. C. GONSER  2,025,505
MEAT TENDERIZER AND CUTTER
Filed March 5, 1934   2 Sheets-Sheet 1

John C. Gonser
INVENTOR

BY Samuel H. Davis
ATTORNEY

John C. Gonser
INVENTOR

BY Samuel H. Davis
ATTORNEY

Patented Dec. 24, 1935

2,025,505

UNITED STATES PATENT OFFICE 2,025,505

MEAT TENDERIZER AND CUTTER

John C. Gonser, Webberville, Mich.

Application March 5, 1934, Serial No. 714,152

6 Claims. (Cl. 17—26)

This invention relates to improvements in machines termed meat tenderizers constructed to crush portions of meat whereby the meat is rendered in better condition to be eaten, and all the juices are saved, and the meat more or less cut and divided.

The object of this invention is the production of an apparatus of the character stated having parts of special construction and arrangement by means of which it is believed the meat is more quickly and thoroughly acted upon without adding to the amount of labor customarily called for in such operations.

By the accompanying drawings the construction and disposition of the various parts of this invention are illustrated and their essential combinations shown. Of the drawings, Fig. 1 represents a horizontal sectional view showing all parts assembled, the top or lid of the outer casing being omitted.

Throughout the drawings and description the same number is used to refer to the same part.

Figure 1:
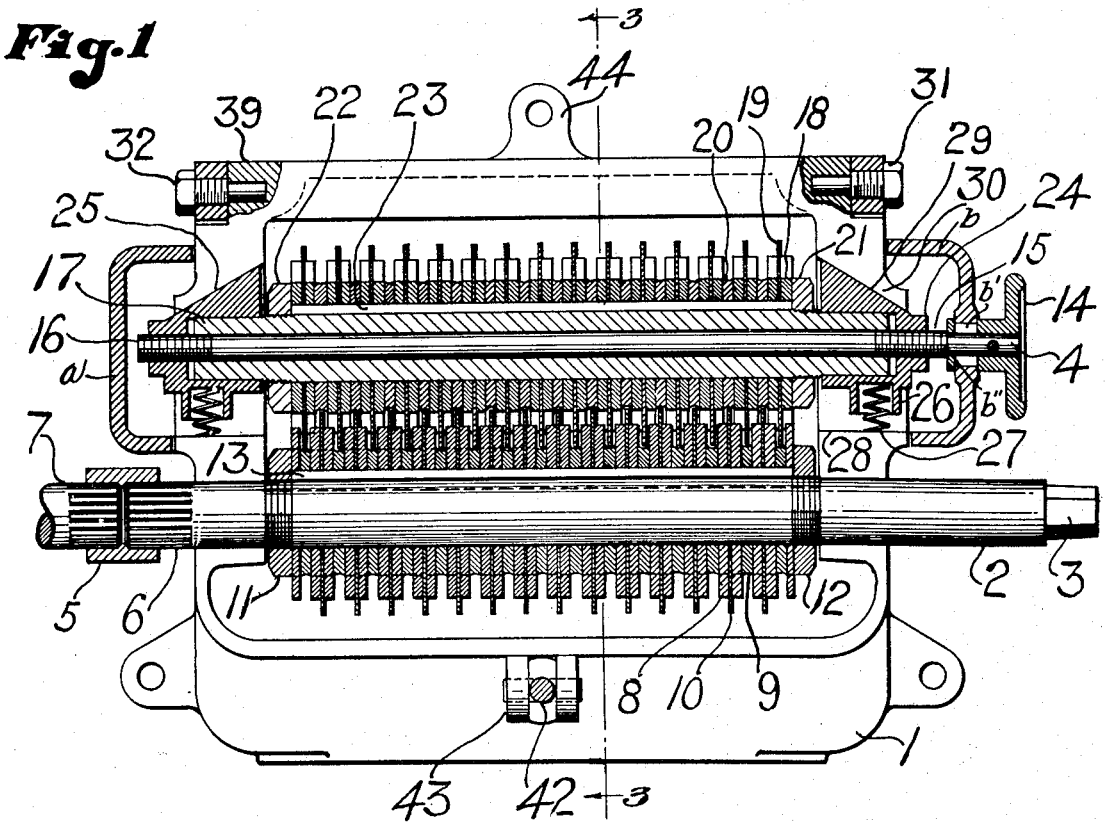
Figure 5:
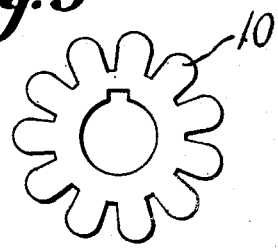
Fig. 5 is a flat side view of one of the cutter members.

Considering the drawings, the lower portion of the outer casing 1 supports a revoluble shaft 2 having an end 3 prepared to engage a crank or hand wheel not shown. Parallel with the shaft 2 is second shaft 4 which will be further described. The left hand end of the shaft 2 is connected by a coupling 5 with the end of an operating shaft, and the end 6 of shaft 2 and the end 7 of the operating shaft are usually serrated to insure a firm connection during the operation. On the shaft 2 are pairs of crushing gears 8 separated by spacers 9 and having between them the cutter members 10, usually, but not essentially star shaped as illustrated in Fig. 5. The pairs of gears with the interposed cutters and spacers are clamped between nuts 11 and 12 on threaded portions of the shaft as best shown in Fig. 1, and are attached to the shaft by the spline 13. Also set forth in Fig. 1 is a hand wheel 14 secured to the shaft 4 and by which that shaft, normally stationary, may be turned. It will be noted that the opposite ends of the shaft 4 are oppositely threaded, those ends being marked 15 and 16. On the shaft 4 are arranged pairs of crushing gears 18 carried by a mandrel 17 revoluble upon the shaft 4 and constituting the second revoluble member mentioned in this explanation. The gears 18 have cutters 19 between them and the pairs of gears are spaced by spacers 20, all as previously described for the shaft 2. The series of gears, cutters and spacers are clamped on the mandrel by nuts 21 and 22, and secured thereto by the spline 23 by which connection the gears are compelled to turn with the mandrel 17.

Figure 2:
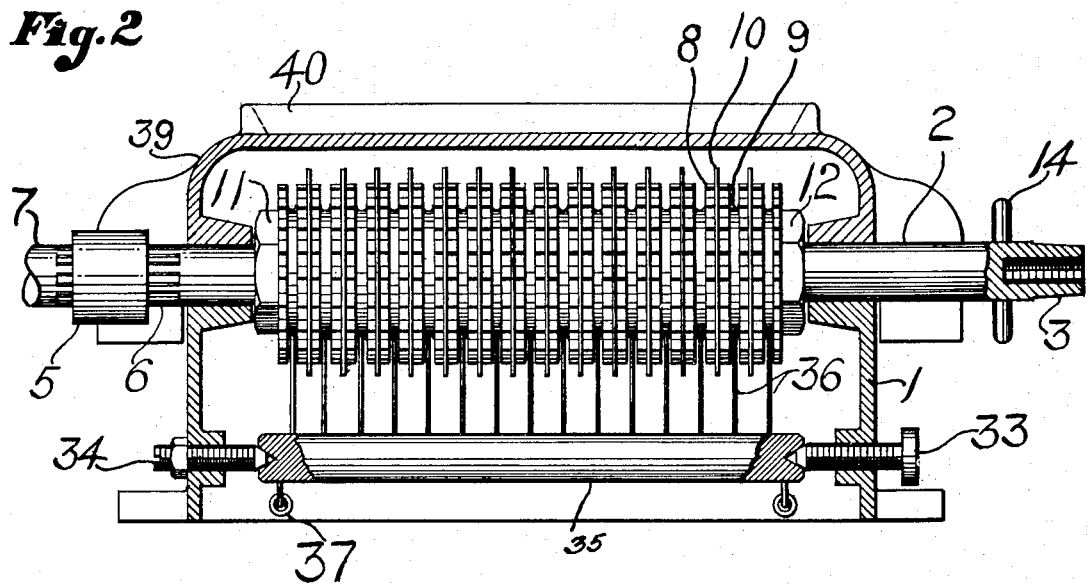
Fig. 2 is a vertical sectional view (along the line 2—2 of Fig. 3) of the casing through the bearings of the revoluble shaft, showing the strippers in position between the pairs of crushing gears.

The shaft 4 is carried in bearings 24 and 25, each of which has a spring seat such as 26 wherein a spring 27 is located. The spring bears upon the interior of the casing and its effect is to press the bearing in a direction away from the revoluble shaft 2. The casing has a ledge or shoulder 28 against which the spring 27 presses when in position. Each of the bearing blocks 24 and 25 has an inclined surface portion such as the incline 29 of bearing 24, and the interior of the casing has a corresponding incline 30 in contact with the incline of the bearing block. The bearings engage the oppositely threaded ends 15 and 16 of the shaft 4 passing axially through the mandrel 17 and upon which the mandrel is revoluble. In Figs. 1 and 2 there will be observed the left and right cup-shaped members $a$ and $b$. Those members are attached at the top to the outer casing 1, as shown in Fig. 2, and they are open at the bottom. The function of the cup-shaped members is to protect the threaded end of the shaft 4 from accidental blows by careless operatives, and from deposited material, and the right hand cup-shaped member $b$ has an opening $b'$ for the passage of the end of shaft 4. A collar $b''$ is secured upon shaft 4 upon the inside of the cup-shaped member over the opening $b'$, while the hand wheel 14 is secured to the shaft 4 over the outside of the said opening. The opening $b'$ is of such extent as to permit the sidewise movements of the shaft 4 towards or from the felloe and parallel shaft 2.

The pivot pins 31 and 32 shown in Fig. 1 secure the top of the casing pivotally. The top is cut away in Fig. 1.

Figure 3:
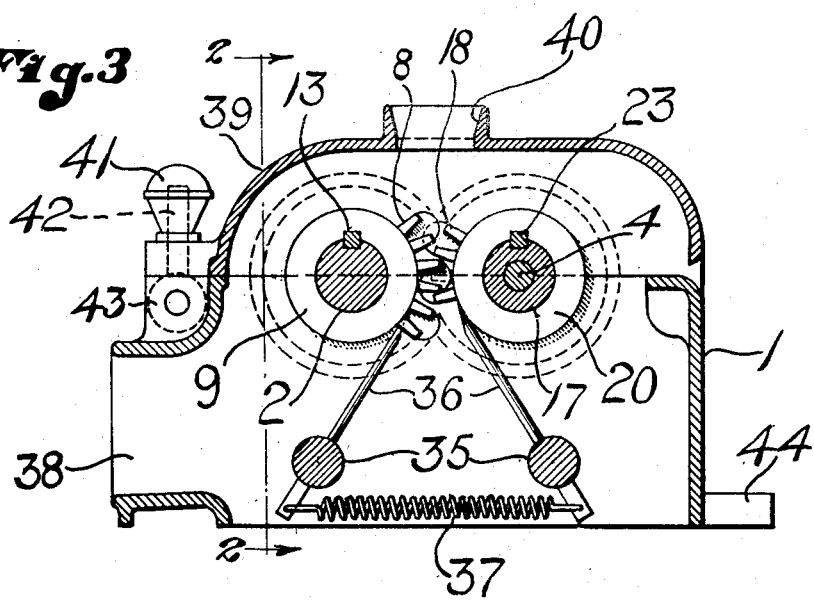
Fig. 3 is a vertical cross section (along the line 3—3 of Fig. 1) of the outer casing showing the revoluble members therein with the crushing gears thereon, and the spring controlled strippers in combination therewith.
Figure 4:
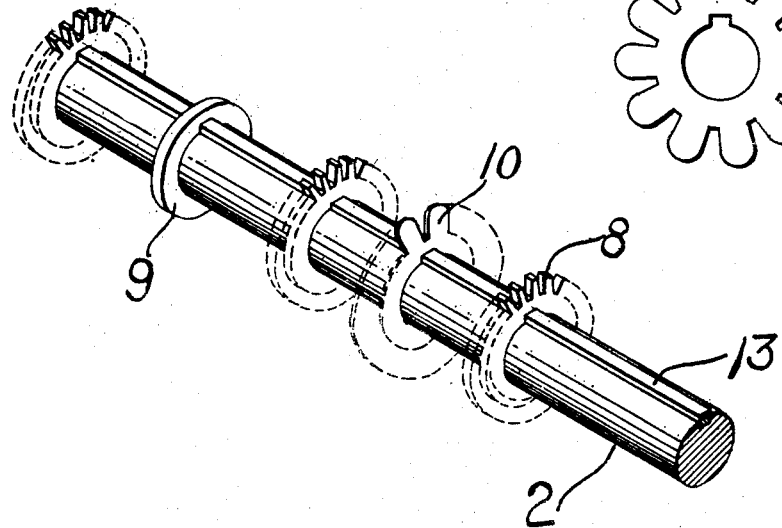
Fig. 4 is a perspective view of a portion of the revoluble shaft showing the crushing gears, the star shaped cutters, and the spacers splined thereon.

In Fig. 2, the pivot screws 33 and 34 pivotally connect the stripper arbor 35 with the casing, and the strippers 36 are shown in Fig. 2 extending between the pairs of crushing gears from which they strip the meat acted upon. Below the arbors 35, of which there are two as illustrated in Fig. 3, the ends of the strippers are extended and joined by the coil springs 37. There are two of the springs 37 as shown in Fig. 2 and their function is to keep the long and usually pointed ends of the strippers in acting position between the pairs of gears and against the spacers separating the pairs.

This invention is not limited to any special formation of external casing. The lower part 1 of the casing may be made with an outlet mouth 38, and the lower portion 1 may be closed at the top by the lid 39 pivotally secured as explained by the pivot pins 31 and 32, and the lid or cover 39 may be made with a receiving mouth 40 for the introduction of the meat. To keep the cover 39 closed, a thumb screw nut 41 engages a vertical bolt 42 swinging on and between ears 43 projecting from the lower portion of the casing as shown in Fig. 1.

In the operation of this invention, the casing may be secured by means of the lugs 44 to a table or to any selected receptacle. The meat to be treated is introduced by way of the inlet in the top of the casing and emerges or is withdrawn by way of the outlet in the lower portion of the casing. The bottom of the casing is open, and any meat juices may descend and be caught in a suitable dish supported below the casing. The strippers continuously free the crushed meat gears, and it will be noted that the entire apparatus may be readily taken apart and its individual members conveniently subjected to any desired cleansing processes.

Having now described this invention, and the manner of its use, I claim:—

1. In a meat tenderizer, a supporting casing, a shaft supported rotatively therein, pairs of crushing gears carried by the shaft, cutter members arranged between the gears of each pair of gears, spacers arranged between the said pairs of gears to space the pairs apart, a stationary shaft having oppositely threaded ends, bearings for said threaded ends, the said bearings being provided with springs arranged to act against the interior of the casing whereby said bearings are normally pressed away from said revoluble shaft, the said bearings and the casing having engaging inclined portions whereby when said stationary shaft is turned said bearings move the stationary shaft parallel with respect to said revoluble shaft, and a revoluble mandrel on said stationary shaft, the said mandrel being provided with pairs of crushing gears with interposed cutter members and spacers, and the said cutter members carried by either shaft being constructed and arranged to extend between the pairs of gears on the other shaft and to the said spacers.

2. In a meat tenderizer, a supporting casing, parallel revoluble members, parallel revoluble members supported by the casing, each of said members having thereon and attached thereto pairs of crushing gears, each pair of gears having an interposed cutter member, and spacers arranged to separate said pairs of gears, the said cutter members on one revoluble member extending between said pairs of gears carried by the other revoluble member and to the spacers thereof.

3. In a meat tenderizer, a supporting casing, parallel revoluble members supported by the casing, one of said members being adjustable towards or from the other member, each of said members being provided with spaced crushing gears having interposed cutter members and spacers, the cutter members of one revoluble member extending between the pairs of crushing gears of the other member and towards the spacers thereon, and means for moving one revoluble member with respect to the other.

4. In a meat tenderizer, a supporting casing, parallel revoluble members borne by the casing, said members being provided with pairs of crushing gears and cutter members, spacers separating said pairs of gears, and pivotally supported spring controlled strippers arranged to strip crushed meat from said gears.

5. In a meat tenderizer, a shaft, a plurality of crushing gears carried by the shaft, said gears being arranged in pairs, each pair of gears having interposed star shaped cutter members, said cutter members being greater in diameter than the said gears, and spacers separating said pairs of gears and arranged to cooperate with said cutter members.

6. In a meat tenderizer, a supporting casing, parallel revoluble members supported by the casing and provided with means for reducing meat, one of said revoluble members having axially through it a stationary shaft constructed with oppositely threaded ends, and bearings engaging said threaded ends, said bearings having springs arranged to act upon the interior of the casing, the said bearings and casing having inclined portions arranged in contact whereby when said axial stationary shaft is turned the said bearings may be separated to move the axial shaft towards the other revoluble member and when said axial shaft is oppositely turned said bearings approach each other and said revoluble members separate, the said springs being adapted to assist the approach of said bearings.

JOHN C. GONSER.